(12) United States Patent
Yamane et al.

(10) Patent No.: US 11,338,973 B2
(45) Date of Patent: May 24, 2022

(54) BINDING TOOL

(71) Applicant: MEILLEUR CO., LTD., Funabashi (JP)

(72) Inventors: Tsurashi Yamane, Funabashi (JP); Kaori Nakagawa, Funabashi (JP); Junko Ochibe, Funabashi (JP)

(73) Assignee: MEILLEUR CO., LTD., Funabashi (JP)

( * ) Notice: Subject to any disclaimer, the term of this patent is extended or adjusted under 35 U.S.C. 154(b) by 0 days.

(21) Appl. No.: 17/269,406

(22) PCT Filed: Sep. 17, 2020

(86) PCT No.: PCT/JP2020/035258
§ 371 (c)(1),
(2) Date: Feb. 18, 2021

(65) Prior Publication Data
US 2022/0081177 A1 Mar. 17, 2022

(51) Int. Cl.
*B65D 63/10* (2006.01)
(52) U.S. Cl.
CPC .................. *B65D 63/1063* (2013.01)
(58) Field of Classification Search
CPC .......... B65D 63/1063; B65D 2563/107; Y10T 24/1498
See application file for complete search history.

(56) References Cited

U.S. PATENT DOCUMENTS

| | | | | |
|---|---|---|---|---|
| 3,339,246 A | * | 9/1967 | Geisinger | .......... B65D 63/1063 24/16 PB |
| 3,339,247 A | * | 9/1967 | Geisinger | .......... B65D 63/1027 24/16 PB |
| 3,577,601 A | * | 5/1971 | Mariani | .......... A61B 17/06066 24/16 PB |

(Continued)

FOREIGN PATENT DOCUMENTS

| | | |
|---|---|---|
| CN | 101863340 A | 10/2010 |
| CN | 101910017 A | 12/2010 |

(Continued)

OTHER PUBLICATIONS

Nov. 2, 2020 International Search Report issued in International Patent Application No. PCT/JP2020/035258.

(Continued)

*Primary Examiner* — Robert Sandy
*Assistant Examiner* — Rowland Do
(74) *Attorney, Agent, or Firm* — Oliff PLC (57) ABSTRACT

A binding tool includes: a flexible strip-shaped belt; a head connected to a base end of the belt and including a through hole through which the belt wound around an object is inserted; a plurality of ratchet teeth protruding from a front surface of the belt at positions spaced apart in an extension direction; and a plurality of ratchet claws locking the plurality of ratchet teeth inserted through the through hole, wherein the head has, on one side in a width direction, a slit through which the belt can be inserted or removed, and the (Continued)

plurality of ratchet teeth and ratchet claws are inclined such that each of one end portions thereof on the one side in the width direction is on a downstream side of the extension direction as compared with each of the other end portions thereof on the other side in the width direction.

9 Claims, 7 Drawing Sheets

(56) References Cited

U.S. PATENT DOCUMENTS

| | | | | |
|---|---|---|---|---|
| 3,747,164 | A * | 7/1973 | Fortsch | B65D 63/16 24/16 PB |
| 3,837,047 | A * | 9/1974 | Bunnell | B65D 63/1072 24/16 PB |
| 4,447,934 | A * | 5/1984 | Anscher | F16L 3/233 24/16 PB |
| 4,458,385 | A * | 7/1984 | Espinoza | F16B 2/08 24/16 PB |
| 5,901,416 | A * | 5/1999 | Mears | B65D 63/1063 24/16 PB |
| 10,954,047 | B1 * | 3/2021 | Cogliandro | B65D 63/1081 |
| 2005/0204515 | A1 * | 9/2005 | Hewes | B65D 63/1063 24/16 PB |
| 2008/0028576 | A1 * | 2/2008 | Okamoto | B65D 63/1027 24/16 R |
| 2009/0172921 | A1 | 7/2009 | Vermeer et al. | |
| 2012/0311823 | A1 | 12/2012 | Lee et al. | |
| 2014/0096344 | A1 * | 4/2014 | Creato | B65D 85/04 24/16 PB |
| 2018/0080580 | A1 | 3/2018 | Coulter | |

FOREIGN PATENT DOCUMENTS

| | | |
|---|---|---|
| JP | S53-005282 U | 1/1978 |
| JP | S60-175068 U | 11/1985 |
| JP | 2011-057246 A | 3/2011 |
| JP | 2011-509226 A | 3/2011 |
| JP | 2013-520954 A | 6/2013 |
| JP | 2014-092264 A | 5/2014 |
| KR | 20-1998-0014543 U | 6/1998 |
| KR | 10-2006-0054211 A | 5/2006 |
| KR | 10-2011-0092647 A | 8/2011 |
| KR | 10-2018-0126920 A | 11/2018 |

OTHER PUBLICATIONS

Nov. 2, 2020 Written Opinion issued in International Patent Application No. PCT/JP2020/035258.
Oct. 27, 2020 Office Action issued in Japanese Patent Application No. 2020-551587.
Dec. 1, 2020 Office Action issued in Japanese Patent Application No. 2020-551587.
May 12, 2021 Office Action issued in Korean Patent Application No. 10-2021-7004343.
Sep. 1, 2021 Office Action issued in Chinese Patent Application No. 202080005349.8.
Oct. 27, 2021 Office Action issued in Korean Patent Application No. 10-2021-7004343.

* cited by examiner

BINDING TOOL

TECHNICAL FIELD

The present invention relates to a binding tool for binding an object.

BACKGROUND ART

Conventionally, there has been known a binding tool comprising a strip-shaped belt having flexibility and a head having a through hole into which a belt wound around an object is inserted. This type of the binding tool is generally disposable since the belt inserted into the through hole cannot be pulled out.

With the recent heightened awareness of environmental protection and effective use of resources, binding tools that can be reused have been developed (see, for example, Patent Literature 1). In the case of the binding tool according to Patent Literature 1, the belt can be removed from the head through a slit provided on a side face of the head.

CITATION LIST

Patent Literature

Patent Literature 1: JP-U-S60-175068

SUMMARY OF INVENTION

Technical Problem

However, the binding tool according to Patent Literature 1 requires an opening/closing side part for opening and closing a slit in order to prevent the belt from escaping from a head in a bound state. Therefore, the binding tool according to Patent Literature 1 has, in addition to a problem that the structure of the binding tool becomes complicated, a new problem that an operation of attachment and detachment of the binding tool to be performed by a user also becomes complicated.

The present invention has been made in view of the circumstances above, and an object of the present invention is to provide a reusable binding tool with a simple structure.

Solution to Problem

In order to solve the problems above, the present invention provides a binding tool comprising: a strip-shaped belt having flexibility; a head that is connected to a base end of the belt and includes a through hole through which the belt wound around an object is inserted; a plurality of ratchet teeth that protrudes from a front surface of the belt respectively at positions spaced apart in an extension direction of the belt; and a plurality of ratchet claws that locks the plurality of ratchet teeth of the belt inserted through the through hole, wherein the head is provided with, on one side in a width direction of the belt, a slit through which the belt can be inserted or removed with respect to the through hole, and the plurality of ratchet teeth and the plurality of ratchet claws are inclined such that each of one end portions thereof on the one side in the width direction of the belt is positioned on a downstream side of the extension direction of the belt as compared with each of the other end portions thereof on the other side in the width direction.

Advantageous Effects of Invention

According to the present invention, it is possible to realize a reusable binding tool with a simple structure.

DESCRIPTION OF EMBODIMENTS

Hereinafter, a binding tool 1 according to the present embodiment will be described with reference to the drawings. It should be noted that the embodiment described below of the present invention shows an example in which the present invention is embodied, but does not limit the scope of the present invention to the scope of the description of the embodiment. Accordingly, the present invention may be implemented by adding various modifications to the embodiment.

Figure 1:
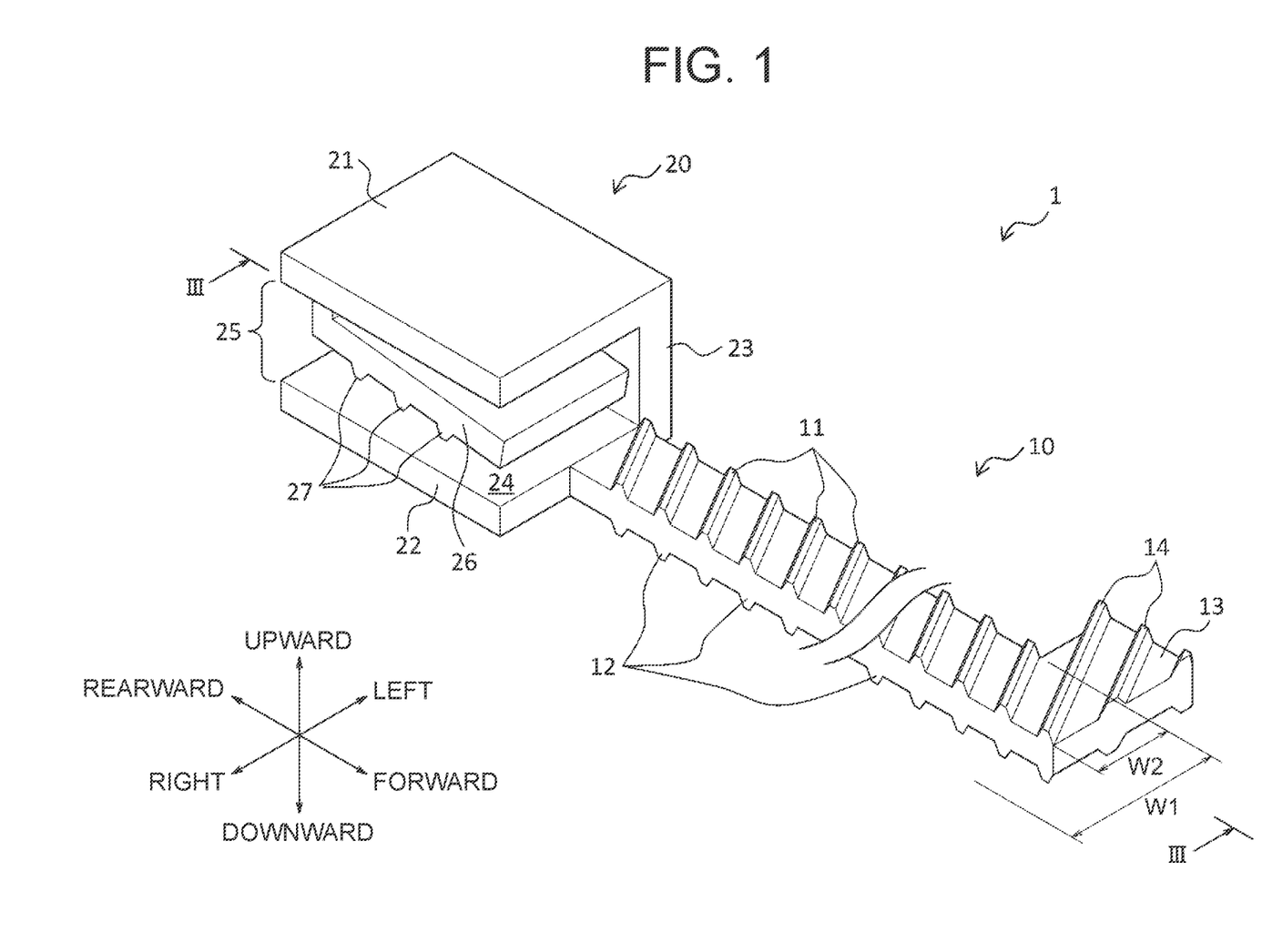
FIG. 1 is a front upper perspective view of a binding tool according to the present embodiment.
Figure 2:
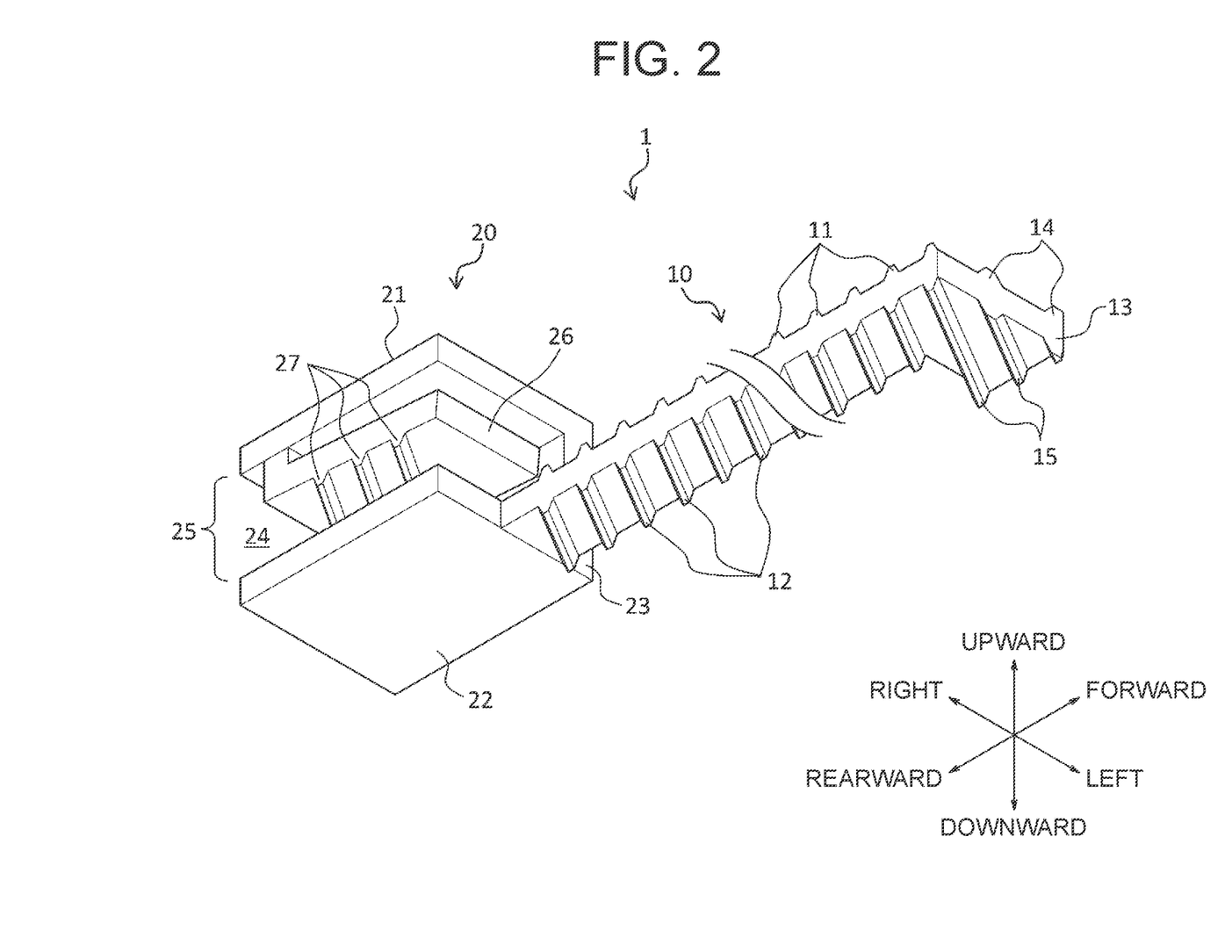
FIG. 2 is a front lower perspective view of a binding tool according to the present embodiment.
Figure 3:
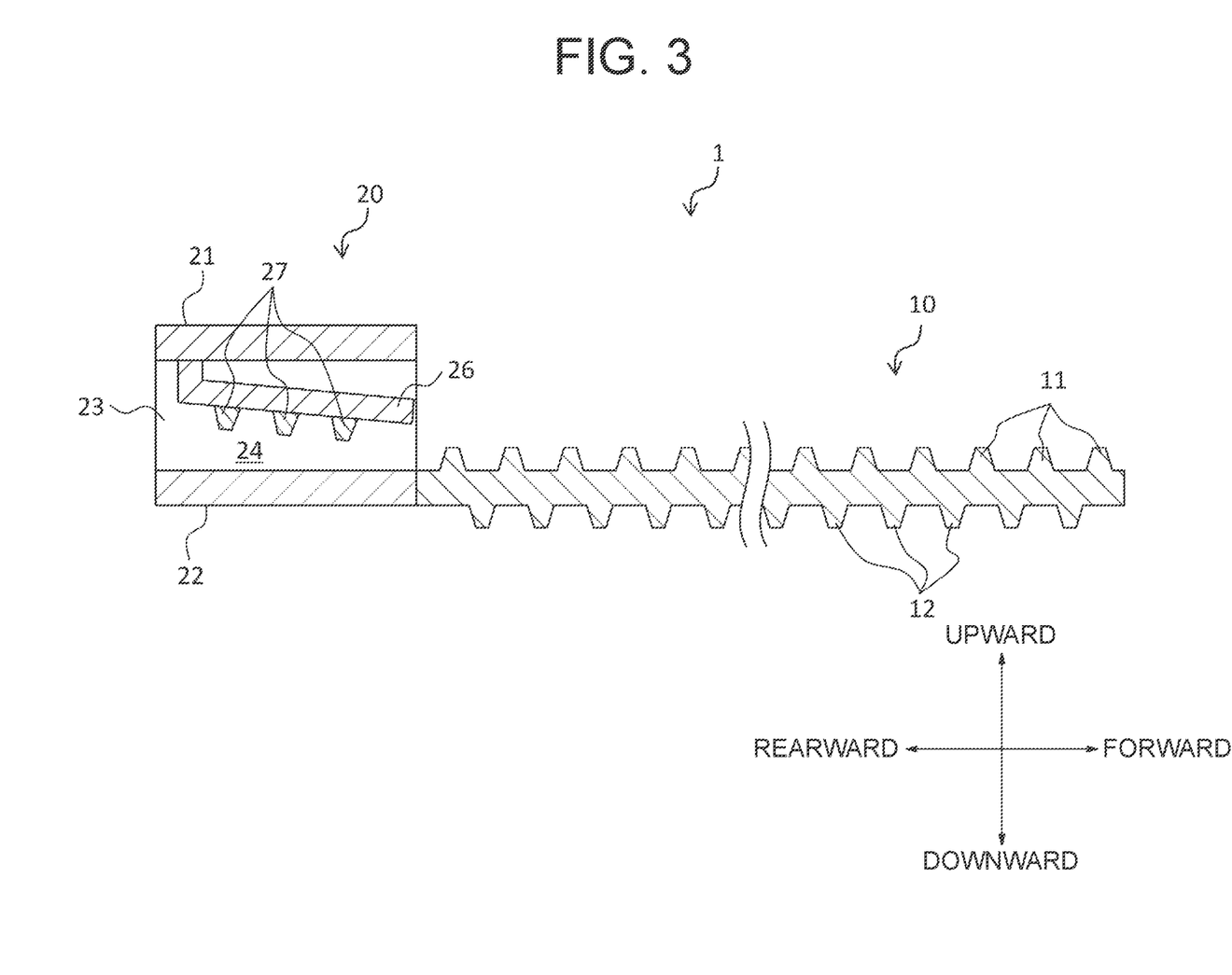
FIG. 3 is a cross-sectional view in a III-III direction of FIG. 1.

FIG. 1 is a front upper perspective view of the binding tool 1 according to the present embodiment. FIG. 2 is a front lower perspective view of the binding tool 1 according to the present embodiment. FIG. 3 is a cross-sectional view in a III-III direction of FIG. 1. As illustrated in FIG. 1 to FIG. 3, the binding tool 1 includes a belt 10 and a head 20. The binding tool 1 is made of, for example, a resin material. The binding tool 1 may be integrally formed, or formed such that the belt 10 and the head 20 are separately formed and then assembled.

In the present embodiment, an extension direction of the belt 10 is referred to as a "front/rear direction", a thickness direction of the belt 10 is referred to as an "up/down direction", and a width direction orthogonal to the extension direction of the belt 20 and the thickness direction of the belt 10 is referred to as a "left/right direction". Furthermore, in FIG. 1 to FIG. 3, a distal end side (downstream side in the extension direction) of the belt 10 is referred to as "forward", and a base end side (upstream side in the extension direction) of the belt 10 is referred to as "rearward". Still further, in FIG. 1 to FIG. 3, a front surface side of the belt 10 is referred to as "upward", and a back surface side of the belt 10 is referred to as "downward". In this connection, it should be noted that the combination of the above-mentioned directions is merely an example, and thus not limited thereto.

The belt 10 is a strip-shaped member having flexibility. The base end of the belt 10 is connected to a front face of the head 20 and the distal end thereof is a free end. The belt 10 is to be wound around an outer peripheral surface of an object. The object may be, for example, a bundle of cables and hoses, a strut, or cables and hoses to be fixed to the strut. The shape of the cross-section of the object is not limited to a circular shape, and may be a rectangular shape (e.g., square timber). One side of the belt 10 to be wound around the object, which is in contact with the object, is referred to as a "back surface", and the other side opposite thereto is referred to as a "front surface".

The belt 10 mainly includes a plurality of ratchet teeth 11, a plurality of protrusions 12, 14, 15, and a tab 13 (attachment portion). In this connection, since FIG. 1 to FIG. 3 are schematic views for providing explanation of the present embodiment easier to understand, there may be a case where amounts of protrusion and intervals of the ratchet teeth 11 and the protrusions 12, 14, 15 differ from actual ones.

The ratchet teeth 11 are provided on the front surface of the belt 10 respectively at positions spaced apart in the front/rear direction. The ratchet teeth 11 protrude upwardly from the front surface of the belt 10 and extend along the front surface of the belt 10. Each of the ratchet teeth 11 extends parallel to each other. The extension direction of the ratchet teeth 11 is inclined with respect to the front/rear direction and the left/right direction. More specifically, the extension direction of the ratchet teeth 11 is inclined such that a right end of each ratchet teeth 11 is positioned forward of a left end thereof. The extension direction of the ratchet teeth 11 is, for example, inclined by about 45 degrees with respect to the front/rear direction.

The protrusions 12 are provided on a back surface of the belt 10 respectively at positions spaced apart in the front/rear direction. The protrusions 12 protrude downwardly from the back surface of the belt 10 and extend along the back surface of the belt 10. Each of the protrusions 12 extends in parallel with each of ratchet teeth 11. As illustrated in FIG. 3, it is desirable that the ratchet teeth 11 and the protrusions 12 are arranged at positions which are displaced with each other in the front/rear direction.

The tab 13 is provided at the distal end of the belt 10. The tab 13 protrudes toward the left direction from the distal of the belt 10. The thickness of the tab 13 is, for example, set to be the same as the thickness of the belt 10. The tab 13 is provided with the protrusions 14 formed on a front surface thereof and the protrusions 15 formed on a back surface thereof. The protrusions 14, 15 correspond to convex portions, and spaces between the adjacent protrusions 14, 15 correspond to concave portions. Meanwhile, the number of protrusions 14, 15 provided on the tab 13 may be one each.

The pitch, protrusion amount, width, and extension direction of the respective protrusions 14 are, for example, the same as those of the ratchet teeth 11 provided on the front surface of the belt 10. The pitch, protrusion amount, width, and extension direction of the respective protrusions 15 are, for example, the same as those of the protrusions 12 provided on the back surface of the belt 10. Meanwhile, the shapes of the protrusions 14, 15 are not limited to the above-described example.

The head 20 locks the belt 10 wound around the object, thereby functioning to keep a state where the binding tool 1 binds the object. In addition, since the head 20 is formed to be able to release the locked state of the belt 10, the bundling tool 1 is reusable. The head 20 mainly includes a top wall 21, a bottom wall 22, and a side wall 23.

The top wall 21 and the bottom wall 22 are disposed to face with each other having a predetermined space therebetween in the up/down direction. The sidewall 23 connects a left end of the top wall 21 and a left end of the bottom wall 22. As a result, a through hole 24 which is surrounded by the top wall 21, the bottom wall 22, and the side wall 23 is formed in the head 20. The through hole 24 is opened in the directions of the front face, rear face, and right face (face opposite to the side wall 23) of the head 20.

The base end of the belt 10 is connected to the front face of the head 20 where the through hole 24 is opened. In other words, as illustrated in FIG. 1 to FIG. 3, when the belt 10 is extended straight in the front/rear direction, the extension direction of the through hole 24 is parallel to the belt 10 in the extended state. The belt 10 wound around the object is inserted through the through hole 24.

On the other hand, a right face of the head 20 is not closed by a side wall. In other words, the right face of the head 20 is opened by a slit 25. The slit 25 communicates the through hole 24 with the outside of the head 20. More specifically, the slit 25 allows the belt 10 to be inserted into and removed from the through hole 24. In the left/right direction of the binding tool 1, the protruding direction of the tab 13 is opposite to the position of the slit 25. In this connection, it may be formed such that the tab 13 protrudes in the right direction while the slit 25 is formed on the left side of the head 20.

The head 20 includes a claw support portion 26 and a plurality of ratchet claws 27. The claw support portion 26 is provided on a lower face of the top wall 21. The claw support portion 26 is inclined downwardly toward the front of the head 20. That is, the space between the bottom wall 22 and the claw support portion 26 (in other words, the height of the through hole 24) is gradually narrowed (decreased) toward the front of the head 20. Furthermore, the claw support portion 26 is formed to be elastically deformable in the up/down direction.

The claws 27 are formed on a lower face of the claw support portion 26 (i.e., face facing the through hole 24). The ratchet claws 27 lock the ratchet teeth 11 of the belt 10 which have been inserted through the through hole 24 in order to prevent the belt 10 from escaping from the through hole 24. In this connection, the number of the ratchet claws 27 is not limited to plural, but may be one.

The ratchet claws 27 protrude downwardly from the lower face of the claw support portion 26 respectively at positions spaced apart in the front/rear direction, and extend along the lower face of the claw support portion 26. Each of the ratchet claws 27 extends in parallel with each other. The extension direction of the ratchet claws 27 is inclined such that a right end of the ratchet claws 27 is positioned forward of a left end thereof.

The extension direction of the ratchet claws 27 is parallel to the extension direction of the ratchet teeth 11 of the belt 10 inserted through the through hole 24. Typically, the pitch, protrusion amount, width, and extension direction of the ratchet claws 27 are the same as those of the ratchet teeth 11 provided on the front surface of the belt 10. Meanwhile, the extension direction of the ratchet teeth 11 and the extension direction of the ratchet claws 27 are not limited to the above-mentioned examples as long as each of the ratchet teeth 11 and ratchet claws 27 are inclined such that each portion thereof on the side where the slit 25 is provided is positioned forward of the opposite portion.

As illustrated in FIG. 1, the width W1 of the through hole 24 in the left/right direction (in other words, distance from the right face of the side wall 23 to the slit 25) is set larger than the width W2 of the belt 10 in the left/right direction. More specifically, the width W1 of the through hole 24 is set to be twice or more the width W2 of the belt 10.

Figure 4:
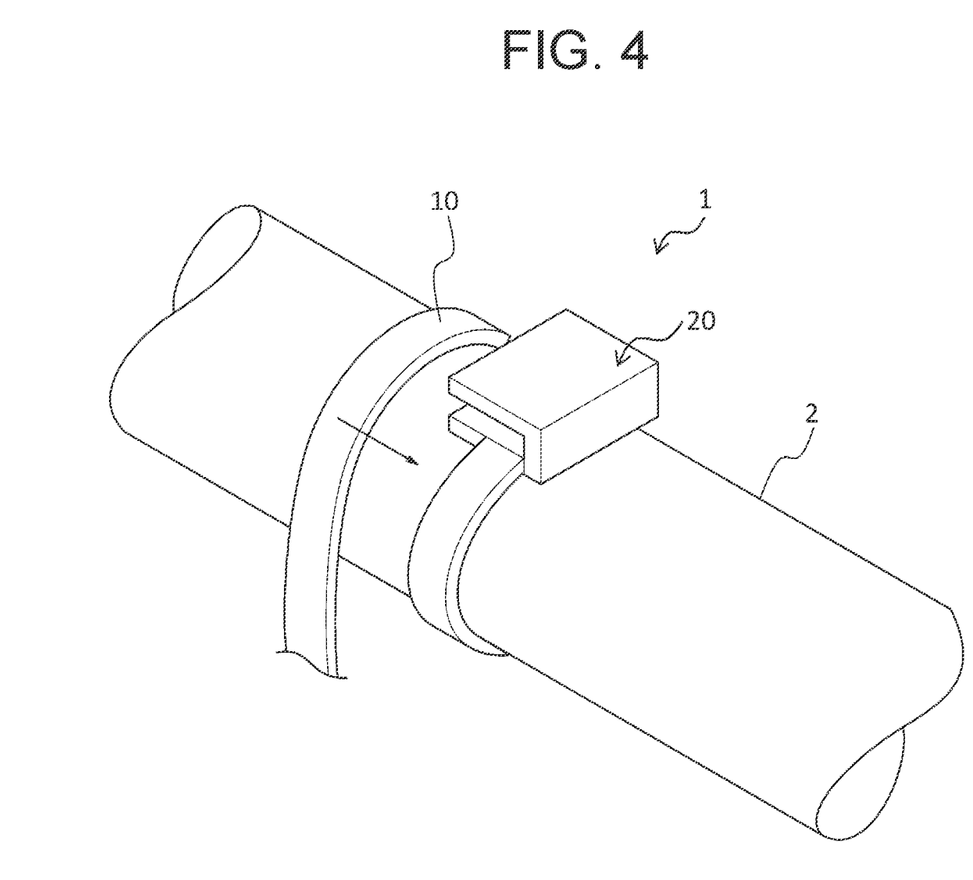
FIG. 4 is a perspective view of a state in which a belt is wound once around an object.
Figure 5:
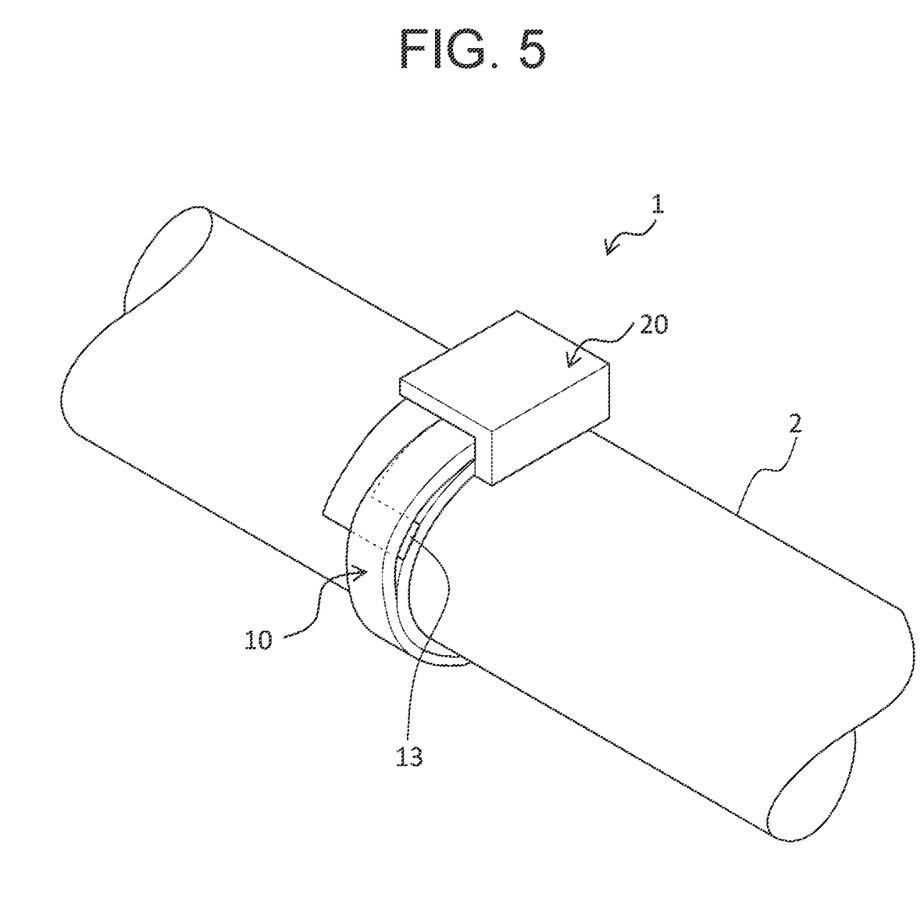
FIG. 5 is a perspective view of a state in which a belt is wound twice around an object.
Figure 6:
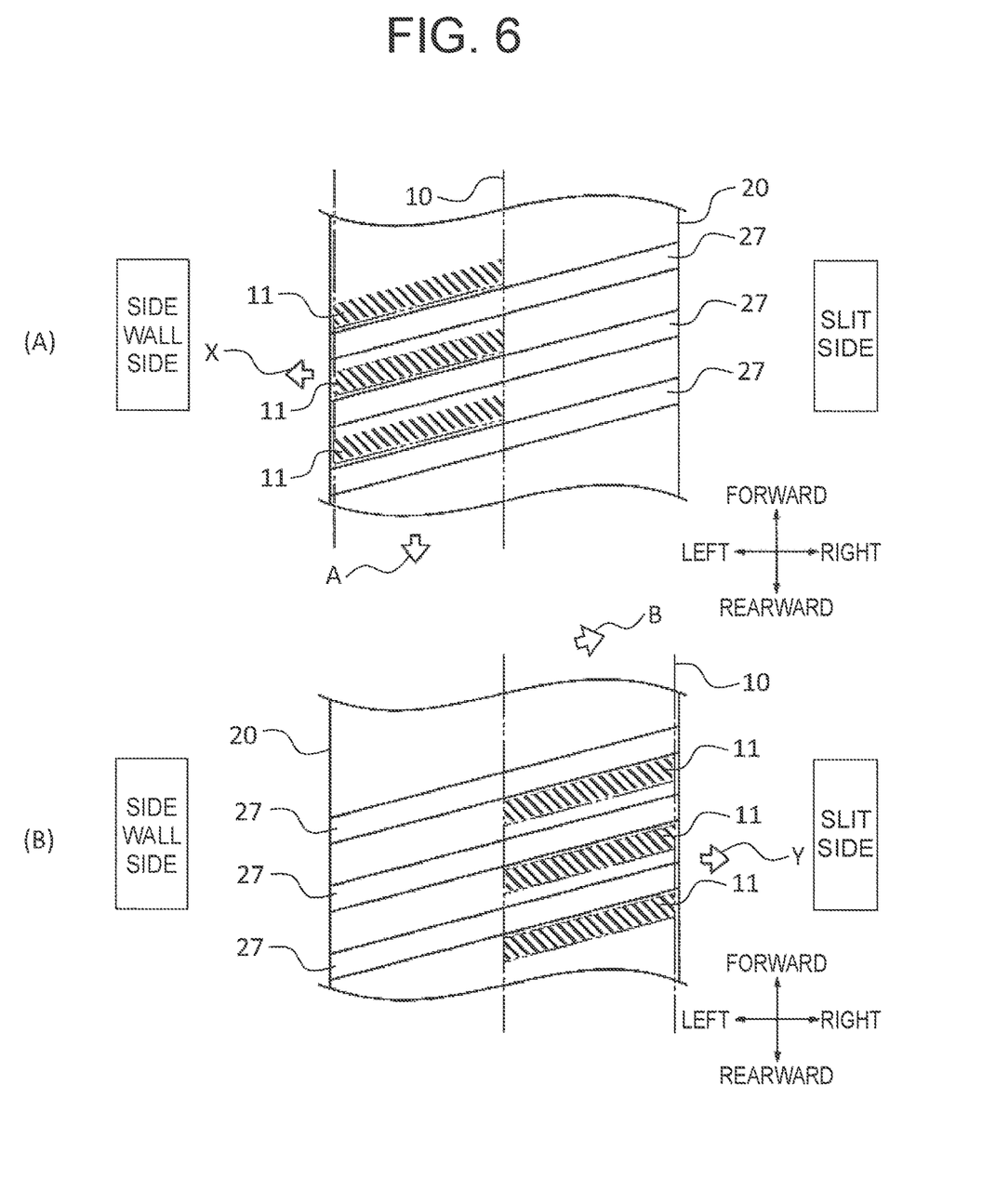
FIG. 6 illustrates a relationship between ratchet teeth and ratchet claws.

Next, with reference to FIG. 4 to FIG. 6, a procedure for fixing the binding tool 1 to the object 2 will be described. FIG. 4 is a perspective view of a state in which the belt 10 is wound once around the object 2. FIG. 5 is a perspective view of a state in which the belt 10 is wound twice around the object 2. FIG. 6 illustrates a relationship between the ratchet teeth 11 and the ratchet claws 27.

First, as illustrated in FIG. 4, a user brings a lower face of the head 20 (more specifically, lower surface of the bottom wall 22) into contact with the outer peripheral surface of the object 2. Next, the user winds the belt 10 around the outer peripheral surface of the object 2. Then, the user inserts the belt 10 which has been wound once around the object 2 into the through hole (more specifically, space between the bottom wall 22 and the claw support portion 26) from the slit 25. The belt 10 inserted into the through hole 24 elastically deforms the claw support portion 26 upwardly. As a result, the ratchet teeth 11 are locked with the ratchet claws 27 by the elastically downwardly restoring force of the claw support portion 26.

Here, as illustrated in FIG. 6A, when releasing the hand from the belt 10 inserted into the through hole 24, the force in the direction of an arrow A acts on the belt 10 that tries to elastically recover its original state. Thus, a rear surface of each of the ratchet teeth 11 engages with a front surface of each of the ratchet claws 27, and accordingly, the belt 10 moves along the ratchet claws 27 in the direction of the arrow X. As a result, the belt 10 is pressed against the side wall 23 so that it is prevented from naturally escaping from the head 20.

Next, as illustrated in FIG. 5, the user further winds the belt 10, which has been once wound around the object 2 and passed through the through hole 24, around the object 2. Then, the user inserts the belt 10 which has been twice wound around the object 2 into the through hole 24 from the slit 25. The relationship between the ratchet teeth 11 of the belt 10 which has been wound around the object 2 for the second time and the ratchet claws 27 of the head 20 is the same as that in the explanation using FIG. 6A. In the interior of the through hole 24, a portion of the belt 10 which has been wound around the object 2 for the first time and a portion of the belt 10 which has been wound around the object 2 for the second time are disposed adjacent to each other in the left/right direction.

The user repeats a series of operations of winding the belt 10 around the object 2 and inserting the belt 10 into the through hole 24 from the slit 25 for a plurality of times (=W1/W2). Furthermore, as illustrated in FIG. 5, the user inserts the tab 13 provided on the distal end of the belt 10 between portions of the belt 10 wound around the object 2 (or between the object 2 and the belt 10).

Next, as illustrated in FIG. 6B, when the user displaces the distal end of the belt 10 fixed to the object 2 in the direction of an arrow B, each of a front surface of the ratchet teeth 11 engages with each of a rear surface of the ratchet claws 27. Thus, the belt 10 moves along the ratchet claws 27 in the direction of an arrow Y. As a result, the belt 10 is removed from the head 20 from the slit 25. That is, binding of the binding tool 1 to the object 2 is released.

According to the present embodiment, for example, the advantageous operations and effects as below can be obtained.

According to the present embodiment, since the ratchet teeth 11 and the ratchet claws 27 are inclined with respect to the width direction of the belt 10, it is possible to prevent the belt 10 from naturally escaping from the head 20. In addition, it is possible to easily remove the binding tool 1 from the object 2 only by displacing the distal end of the belt 10 along the ratchet claws 27. As a result, the bundling tool 1 which is reusable with a simple structure can be realized.

Furthermore, according to the present embodiment, since the protrusions 12 which are parallel to the ratchet teeth 11 are provided on the back surface of the belt 10, each of the ratchet teeth 11 and each of the protrusions 12 are engaged with (in contact with) each other at a portion where the belt 10 partially overlaps therebetween. As a result, the resistance on the surface where a portion of the belt 10 is in contact with other portions thereof increases, and accordingly, the binding tool 1 can be firmly attached to the object 2.

Still further, according to the present embodiment, since each of the ratchet teeth 11 and each of the protrusions 12 are displaced with each other in the front/rear direction, it is possible to uniform the thickness of the belt 10 in the front/rear direction. As a result, in the case of manufacturing the binding tool 1 by injection molding, it is possible to prevent generation of sink or warpage of the belt 10. In addition, since the belt 10 does not include a thin portion, it is possible to prevent lowering of the strength of the belt 10.

Still further, according to the present embodiment, since the width W1 of the through hole 24 is set to be more than twice the width W2 of the belt 10, the belt 10 can be wound around the object 2 for a plurality of times. As a result, it is possible to bind the object 2 firmly.

Still further, according to the present embodiment, since the base end of the belt 10 is connected to the front face of the head 20 where the through hole 24 is opened, a portion of the belt 10 extending from the head 20 can be made closely parallel to a portion of the belt 10 inserted through the through hole 24. As a result, it becomes easy to extend the belt 10 along the object 2, thereby making it possible to prevent the distal end of the belt 10 from protruding outwardly in the radial direction of the object 2. Meanwhile, the attachment position of the base end of the belt 10 is not limited to the above-described example, and may be a lower face of the bottom wall 22. That is, the extension direction of the through hole 24 and the belt 10 may not be parallel to each other.

Still further, according to the present embodiment, since the tab 13 is inserted between portions of the belt 10 wound around the object 2 or between the object 2 and the belt 10, it is easier to extend the distal end of the belt 10 along the object 2.

In the case of the binding tool 1 which is assumed to be reused (in other words, in the case where the distal end having passed through the through hole 24 cannot be cut out), it is important to extend the distal end of the belt 10 along the object 2 in view of enhancing the aesthetic property in the state of binding the object 2.

Modification

Figure 7:
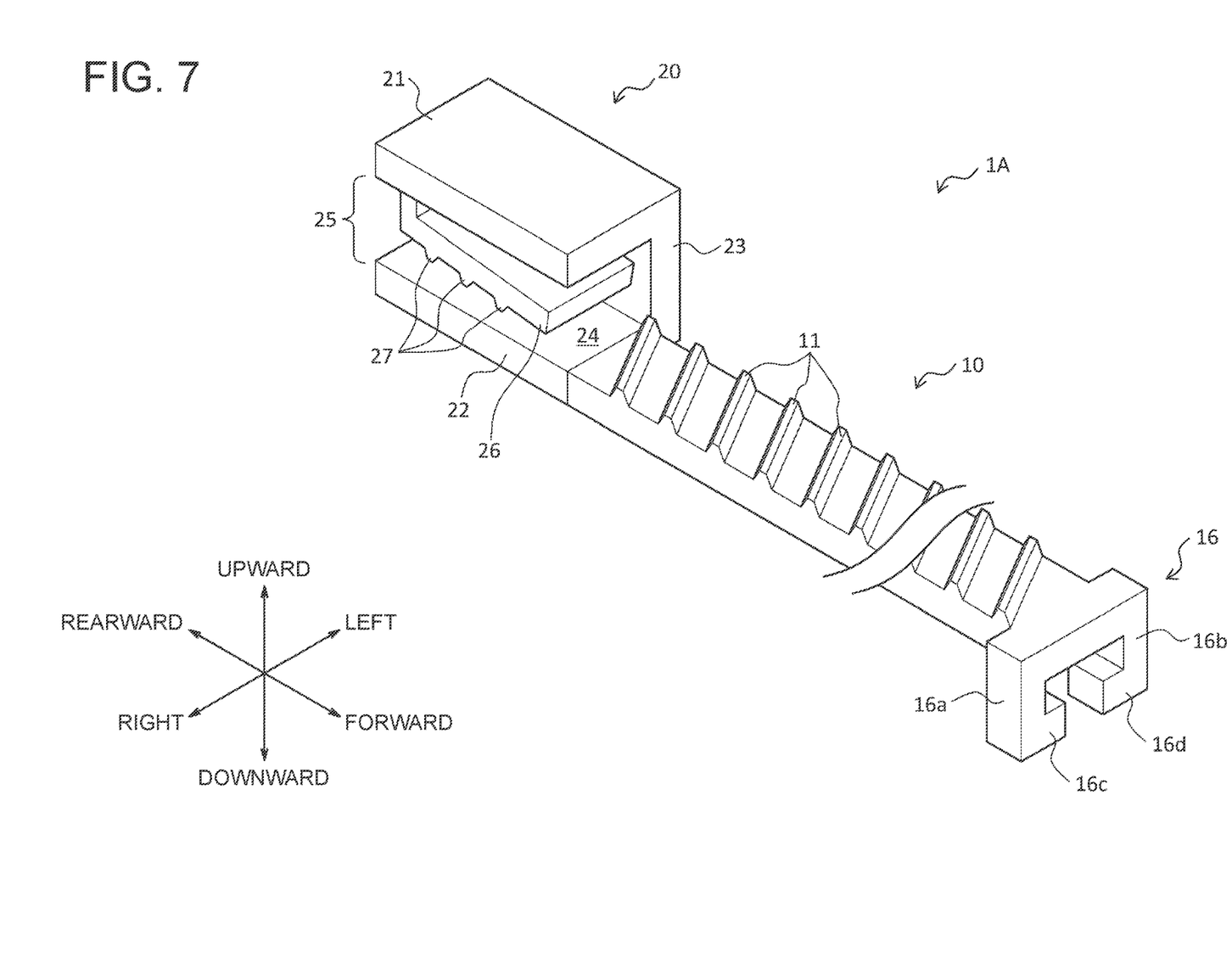
FIG. 7 is a front upper perspective view of a binding tool according to a modification.

The specific structure of the attachment portion is not limited to the tab 13, but any structure may be employed as long as it allows the distal end of the belt 10 passing through the through hole 24 to be attached to an intermediate portion of the belt 10 wound around the object 2. FIG. 7 is a front upper perspective view of a binding tool 1A according to a modification. In the following, differences from the embodiment described above will be focused on while omitting to describe common points therewith.

As illustrated in FIG. 7, the binding tool 1A according to the modification differs from the embodiment described above in that a grip portion 16 is provided instead of the tab 13. In addition, in the binding tool 1A according to the modification, the protrusions 12 are omitted to be provided on the back surface of the belt 10, and the width of the through hole 24 and the width of the belt 10 are made substantially the same.

The grip portion 16 is provided on the distal end of the belt 10. The grip portion 16 includes a pair of projections 16a, 16b which protrudes downwardly from both ends of the belt 10 in the width direction thereof, and a pair of holding portions 16c, 16d which extends from each distal end of the pair of projections 16a, 16b in a direction in which they approach each other. The width of the belt 10 is smaller than a space between the pair of projections 16a, 16b and larger than a space between distal ends of the pair of holding portions 16c, 16d.

The binding tool 1A according to the modification is fixed to the object 2 by the procedure described with reference to FIG. 4 to FIG. 6. Then, the user elastically deforms the pair of projections 16a, 16b in a direction to expand the space between the pair of projections 16a, 16b, and inserts the pair of holding portions 16c, 16d between the object 2 and the belt 10 wound around the object 2. As a result, the pair of projections 16a, 16b and the pair of holding portions 16c, 16d grip the intermediate portion of the belt 10 wound around the object 2. With the grip portion 16 described above, it is also possible to extend the distal end of the belt 10 along the object 2.

Other Modifications

The binding tool 1, LA according to the present invention may include only a part of the technical features described in the embodiment and modification described above. As an example, the ratchet teeth 11 and the ratchet claws 27 may not be inclined with respect to the extension direction of the belt 10 (i.e. they may make right angles). As another example, the belt 10 may not be provided with the attachment portion. As a further example, the width W1 of the through hole 24 may be less than twice the width W2 of the belt 10.

REFERENCE SIGNS LIST 1, 1A binding tool
2 object
10 belt
11 ratchet tooth
12, 14, 15 protrusion
13 tab
16 grip portion
16a, 16b projection
16c, 16d holding portion
20 head
21 top wall
22 bottom wall
23 side wall
24 through hole
25 slit
26 claw support portion
27 ratchet claw

The invention claimed is:

1. A binding tool comprising:
a strip-shaped belt having flexibility;
a head that is connected to a base end of the belt, the head includes a through hole through which the belt wound around an object is inserted, the head including a slit through which the belt is configured to be inserted or removed with respect to the through hole, the slit being located on one side in a width direction of the belt that is orthogonal to an extension direction of the belt and a thickness direction of the belt;
a plurality of ratchet teeth that protrudes from a front surface of the belt respectively at positions spaced apart in the extension direction of the belt; and
a plurality of ratchet claws that locks the plurality of ratchet teeth of the belt inserted through the through hole,
wherein the plurality of ratchet teeth and the plurality of ratchet claws are each inclined diagonally in the width direction, each of the plurality of ratchet teeth and each of the plurality of ratchet claws extend diagonally from one end on the one side in the width direction of the belt, which is a side of the belt that is closer to the slit of the head as compared to the other end, and each of the one ends is positioned on a downstream side of the extension direction of the belt as compared with each of the other end portions of the plurality of ratchet teeth and the plurality of ratchet claws respectively on the other side in the width direction of the belt.

2. The binding tool according to claim 1, further comprising a plurality of protrusions that protrudes from a back surface of the belt and extends parallel to the plurality of ratchet teeth.

3. The binding tool according to claim 2, wherein the plurality of ratchet teeth and the plurality of protrusions are respectively arranged to be displaced relative to each other in the extension direction of the belt.

4. The binding tool according to claim 1, wherein the base end of the belt is connected to a face of the head where the through hole is opened.

5. The binding tool according to claim 1, wherein the belt includes an attachment portion that attaches a distal end of the belt passing through the through hole to an intermediate portion of the belt wound around the object.

6. The binding tool according to claim 5, wherein the attachment portion is a tab that protrudes from the distal end of the belt toward the width direction of the belt.

7. The binding tool according to claim 5, wherein the attachment portion is a grip portion that is provided on the distal end of the belt and holds the intermediate portion of the belt wound around the object from both sides of the belt in the width direction of the belt.

8. The binding tool according to claim 1, wherein a width of the through hole is at least twice a width of the belt.

9. A binding tool comprising:
a strip-shaped belt having flexibility;
a head that is connected to a base end of the belt, the belt includes a through hole through which the belt wound around an object is inserted, the head including a slit through which the belt is configured to be inserted or removed with respect to the through hole, the slit being located on one side in a width direction of the belt that is orthogonal to an extension direction of the belt and a thickness direction of the belt;
a plurality of ratchet teeth that protrudes from a front surface of the belt respectively at positions spaced apart in the extension direction of the belt; and
a plurality of ratchet claws that locks the plurality of ratchet teeth of the belt inserted through the through hole,
wherein:
the plurality of ratchet teeth and the plurality of ratchet claws are each inclined diagonally in the width direction, each of the plurality of ratchet teeth and each of the plurality of ratchet claws extend diagonally from one end on the one side in the width direction of the belt, which is a side of the belt that is closer to the slit of the head as compared to the other end, and each of the one ends is positioned on a downstream side of the extension direction of the belt as compared with each of the other end portions of the plurality of ratchet teeth and the plurality of ratchet claws respectively on the other side in the width direction of the belt, the belt includes an attachment portion that attaches a distal end of the belt passing through the through hole to an intermediate portion of the belt wound around the object, the attachment portion is a tab that protrudes from the distal end of the belt toward the width direction of the belt, and concave and convex portions are formed on a front surface and a back surface of the tab.

\* \* \* \* \*